(12) United States Patent
Nasukawa et al.

(10) Patent No.: US 6,182,027 B1
(45) Date of Patent: Jan. 30, 2001

(54) TRANSLATION METHOD AND SYSTEM

(75) Inventors: Tetsuya Nasukawa, Yokohama; Koichi Takeda; Hideo Watanabe, both of Machida, all of (JP)

(73) Assignee: International Business Machines Corporation, Armonk, NY (US)

( * ) Notice: Under 35 U.S.C. 154(b), the term of this patent shall be extended for 0 days.

(21) Appl. No.: 09/127,429

(22) Filed: Jul. 31, 1998

(30) Foreign Application Priority Data

Dec. 24, 1997 (JP) .................................................. 9-354386

(51) Int. Cl.$^7$ ...................................................... G06F 17/28
(52) U.S. Cl. .................................................... 704/2; 704/7
(58) Field of Search ........................... 704/1–8, 10, 277; 707/530, 536

(56) References Cited

U.S. PATENT DOCUMENTS

| | | | |
|---|---|---|---|
| 4,672,571 | * 6/1987 | Bass et al. | 707/533 |
| 4,706,212 | * 11/1987 | Toma | 704/2 |
| 4,777,617 | * 10/1988 | Frisch et al. | 704/8 |
| 4,873,634 | * 10/1989 | Frisch et al. | 707/533 |
| 4,890,230 | * 12/1989 | Tanoshima et al. | 704/2 |
| 5,029,084 | * 7/1991 | Morohasi et al. | 704/4 |
| 5,065,318 | * 11/1991 | Kugimiya et al. | 704/2 |
| 5,140,522 | * 8/1992 | Ito et al. | 704/2 |
| 5,161,105 | * 11/1992 | Kugimiya et al. | 704/2 |
| 5,357,430 | * 10/1994 | Rackow wt al. | 704/8 |
| 5,475,586 | * 12/1995 | Sata et al. | 704/2 |
| 5,497,319 | * 3/1996 | Chong et al. | 704/2 |
| 5,541,838 | * 7/1996 | Koyama et al. | 704/4 |
| 5,644,774 | * 7/1997 | Fukumochi et al. | 704/4 |
| 5,687,383 | * 11/1997 | Nakayama et al. | 704/4 |
| 5,842,159 | * 11/1998 | Nakamura et al. | 704/4 |
| 5,867,812 | * 2/1999 | Sassano | 704/10 |
| 5,870,702 | * 2/1999 | Yamabama | 704/10 |
| 5,907,821 | * 5/1999 | Kaji et al. | 704/4 |

* cited by examiner

Primary Examiner—Forester W. Isen
Assistant Examiner—Patrick N. Edouard
(74) Attorney, Agent, or Firm—Mc Ginn & Gibb, P.C.; Louis J. Percello, Esq.

(57) ABSTRACT

A machine translation method and system for improving the accuracy of the selection of appropriate words, without incurring any deterioration of the processing efficiency, includes registering, during the translation of a document by using a compound word dictionary, elemental word information of an applied compound word in a discourse dictionary, and employing a plurality of dictionaries, including the discourse dictionary, to translate the document without using a compound word dictionary.

18 Claims, 5 Drawing Sheets

General processing

Fig. 1  General processing

Discourse dictionary registration process

Single-word determination process

Re-translation process

TRANSLATION METHOD AND SYSTEM

BACKGROUND OF THE INVENTION

1. Field of the Invention

The present invention generally relates to a translation system for which high speed processing is required, and in particular to a translation method and system for improving the accuracy of the selection of an appropriate word in machine translation, without incurring any deterioration of the processing efficiency.

2. Description of the Related Art

As a consequence of the World Wide Web (WWW) expansion of the Internet, opportunities for using documents expressed in foreign languages have increased. Further, since many users desire to scan documents in their native languages, there is a growing demand for low priced machine translation software. However, the quality of the text provided by current machine translation software is unsatisfactory, and there are many translation errors.

Since for a connection on the Internet a translation system must initiate a translation process in real time, high speed processing is required and the performance of complicated procedures, such as deep semantic analysis, is difficult. Generally, therefore, such a system is equipped with a dictionary to reduce the number of unknown words, and for document scanning, more or less ambiguous translations are prepared that are at least prevented from straying to far from the point. To avoid complicating the process and to increase the accuracy of a translation, the data structure of such a dictionary tends to be relatively simple, and word translations tend to be registered not only as individual word units (e.g., a single word dictionary), but also as compound word units (e.g., a compound word dictionary). During a translation, since the simple data structure has a poor word selection function, when there are words for which the translation is registered by the units of compound words, the selection of the translation registered for the compound word unit frequently results in a better translation.

Further, in general isolated translation of individual sentences is performed. As a result, for a specific word that is repeatedly used in a plurality of locations in the same text, there may also be given a plurality of translations. For one location, a translation may be selected from an entry in a single word dictionary, and for another location a translation may be selected from an entry in a compound word dictionary.

To resolve this problem, according to a machine translation method disclosed in Japanese Unexamined Patent Publication No. Hei 3-135666, in a translation process information concerning a translation that is obtained as the result of a dictionary search is saved in a main memory, and is re-used for the same word, so that the time spent searching a dictionary located in an auxiliary storage device is saved and so that the translation of the word is consistent. With this method, however, when an incorrect translation is first selected for a word, the incorrect translation is used in all the locations in a document at which that word appears.

For a method employed for the processing of a plurality of sentences, which is disclosed in Japanese Unexamined Patent Publication No. Hei 2-228765, for a document consisting of a plurality of sentences, the inherent ambiguity of each sentence is calculated and translation is initiated for the least ambiguous sentence. The results obtained for a polysemous word in a preceding sentence are used for a succeeding sentence in order to increase the accuracy in the selection of an appropriate translation and in order to provide a consistent translation. This method, however, is premised on the assumption that a translation will be output after all the sentences in the document have been processed, and thus it can not be employed for a process by which sentences are successively translated from the beginning of a document, as when a translation process is initiated in real time while a system is connected to the Internet.

SUMMARY OF THE INVENTION

In view of the foregoing and other problems of the conventional methods and structures, an object of the present invention is to provide a machine translation method and system that together improve the accuracy of the selection of appropriate words, without incurring any deterioration of the processing efficiency.

It is another object of the present invention to provide a translation method and system that, only when a sentence for translation is selected by a user and without requiring the employment of a complicated process, automatically examines the definitions of words to select preferred words and can thus improve the accuracy of a translation.

It is an additional object of the present invention to provide a translation method and system that can translate words in consonance with context, without requiring a complicated process, such as a grammatical description process.

It is a further object of the present invention to provide a system that, for candidate words, accumulates preference information, which is obtained as a discourse dictionary during the translation of a document, and employs that information as a personal dictionary to automatically study the preferences of candidate words.

To achieve the above objects, during the translation of a document by using a compound word dictionary, elemental word information of an applied compound word is registered in a discourse dictionary, and to translate a word in the document that is not defined in the compound word dictionary, a plurality of dictionaries, including the discourse dictionary, are employed. More specifically, the following methods are provided.

When a compound word dictionary is employed to translate a document, the elemental word information of an employed compound word is registered in a discourse dictionary.

Elemental words, their candidate words, and preferences for these candidate words are described as the elemental word information for a compound word to be described in the discourse dictionary.

A candidate word selection method is provided whereby, to determine a translation for elemental words of a compound word to be described in a discourse dictionary, a candidate translation obtained from a single word dictionary for the elemental word is compared with a candidate translation for the compound word, and the candidate word that has the most nearly identical character string portion is selected. Further provided is a registration adequacy determination method whereby registration of a compound word in a discourse dictionary is canceled when the ratio of the identical character string portion in the candidate word does not exceed a threshold value.

A numeral value, which is obtained by multiplying the word length of a compound word by the ratio of the identical character string portion of the candidate word to that of the compound word, is employed as a preference for the candidate word for the elemental word. When the same candidate word has been registered with the same headword, a new preference value is added to a preference value that has already been provided.

When a specific sentence is to be translated, a discourse dictionary is referred to for a word for which a compound word dictionary cannot be employed, and if a headword exits, a registered candidate word to which the highest preference is given is selected.

A discourse dictionary including units of translated sentences, and a plurality of discourse dictionaries, which have been prepared for various sentences translated by a specific person, are merged to create an automatic learning personal dictionary.

A method for adjusting the learning function of a personal dictionary also is provided, whereby the preferences in an updated discourse dictionary are first selected to merge a plurality of discourse dictionaries.

A dictionary employment method also is provided whereby, when a compound dictionary is not employed to translate a specific document, a discourse dictionary is referred to first, and then an automatic learning personal dictionary is referred to.

Further, a method is provided whereby, to translate a specific document, candidate words into which individual words in a document were translated are recorded, the contents of the translation of the text are compared with a generated discourse dictionary when the translation is completed in order to evaluate how the first translation may be changed by re-translation, the evaluation results are provided for a user, and in response to a user's request, the translation is performed again by using the generated discourse dictionary.

Additionally, a translation results recording method is provided whereby headwords (e.g., words in a source language) and their candidate words, and the count of the headwords translated into the candidate words (or the sentence number of a translated sentence) are described as the translation results (e.g., a record of which candidate words were used for translating the individual words in a document).

Additionally, a re-translation result change evaluation method is provided whereby, after the document has been translated, a discourse dictionary is compared with the translation, and a count is acquired of the words that were translated into words other than candidate words that have the highest preferences in the discourse dictionary, so that the number of locations at which the candidate words are changed through re-translation is acquired.

Furthermore, a method for increasing the efficiency of a re-translation process is provided, whereby, for re-translation of a document, only these sentences are processed for which the translation will be changed.

Additionally, a candidate word selection mechanism is provided that employs a co-occurrence dictionary with which, when as candidate words there are n specific words, a minimum of one translation can be designated.

Conventionally, for the translation of a single word, unless a special translation mechanism is employed, either the first candidate word in the system dictionary is employed, or a candidate word selected by a user during the post-editing process is employed.

In contrast, when the co-occurrence dictionary of the present invention is employed, the translation of words according to the context can be provided without a complicated process, such as the grammatical description process, being performed. This is very effective not only for a person in charge of the development of a translation system, but also for a common user because it serves as a resource that compensates for a user's dictionary and designates more appropriate candidate words.

Further, in the translation system of the present invention, during the translation of a document priority information for candidate words is stored as the discourse dictionary, which is later used as a personal dictionary, so that the priority for a candidate word can be automatically learned.

The present disclosure relates to subject matter contained in Japanese Patent Application No. 9-354386, filed Dec. 24, 1997, which is expressly incorporated herein by reference in its entirety.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
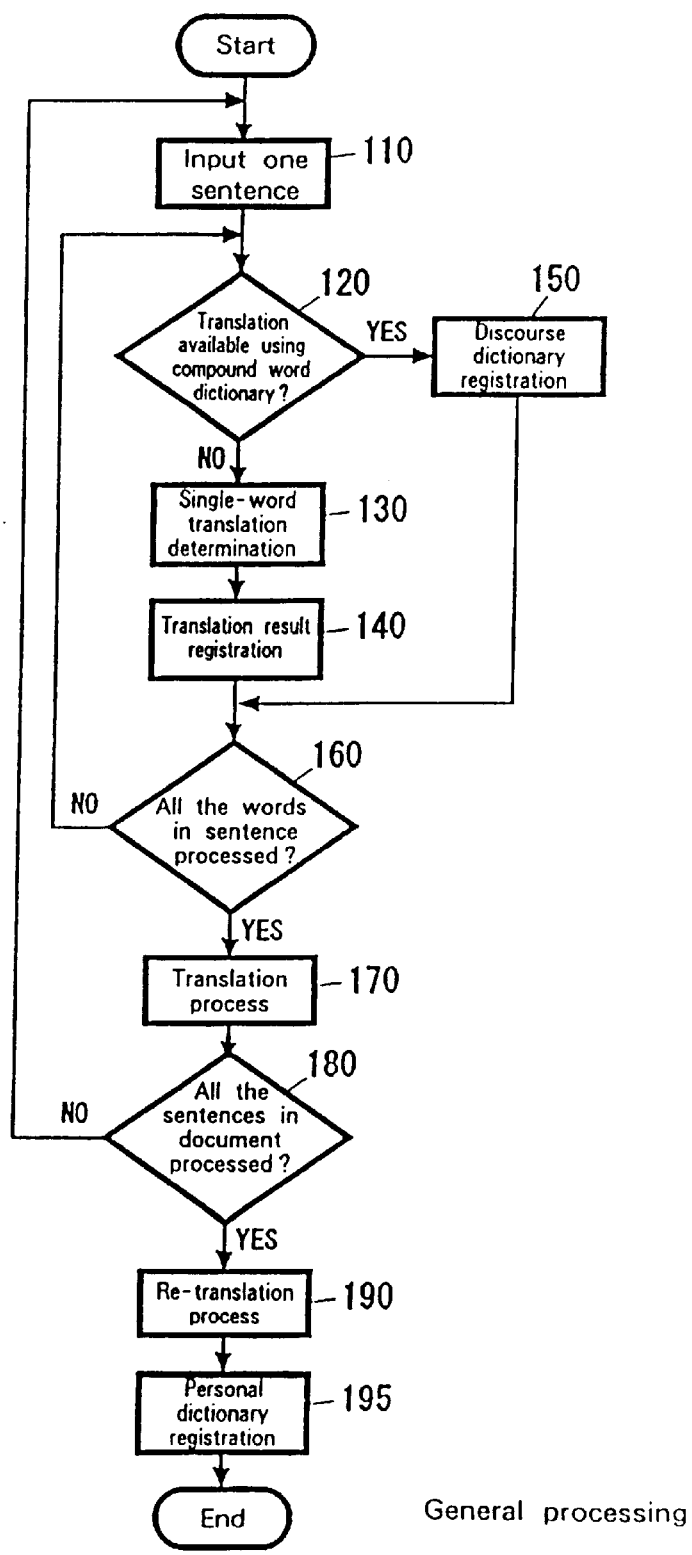
FIG. 1 is a flowchart showing the translation process according to the present invention.

Referring now to the drawings, and more particularly to FIGS. 1–5, there are shown preferred embodiments of the method and structures according to the present invention.

Figure 5:
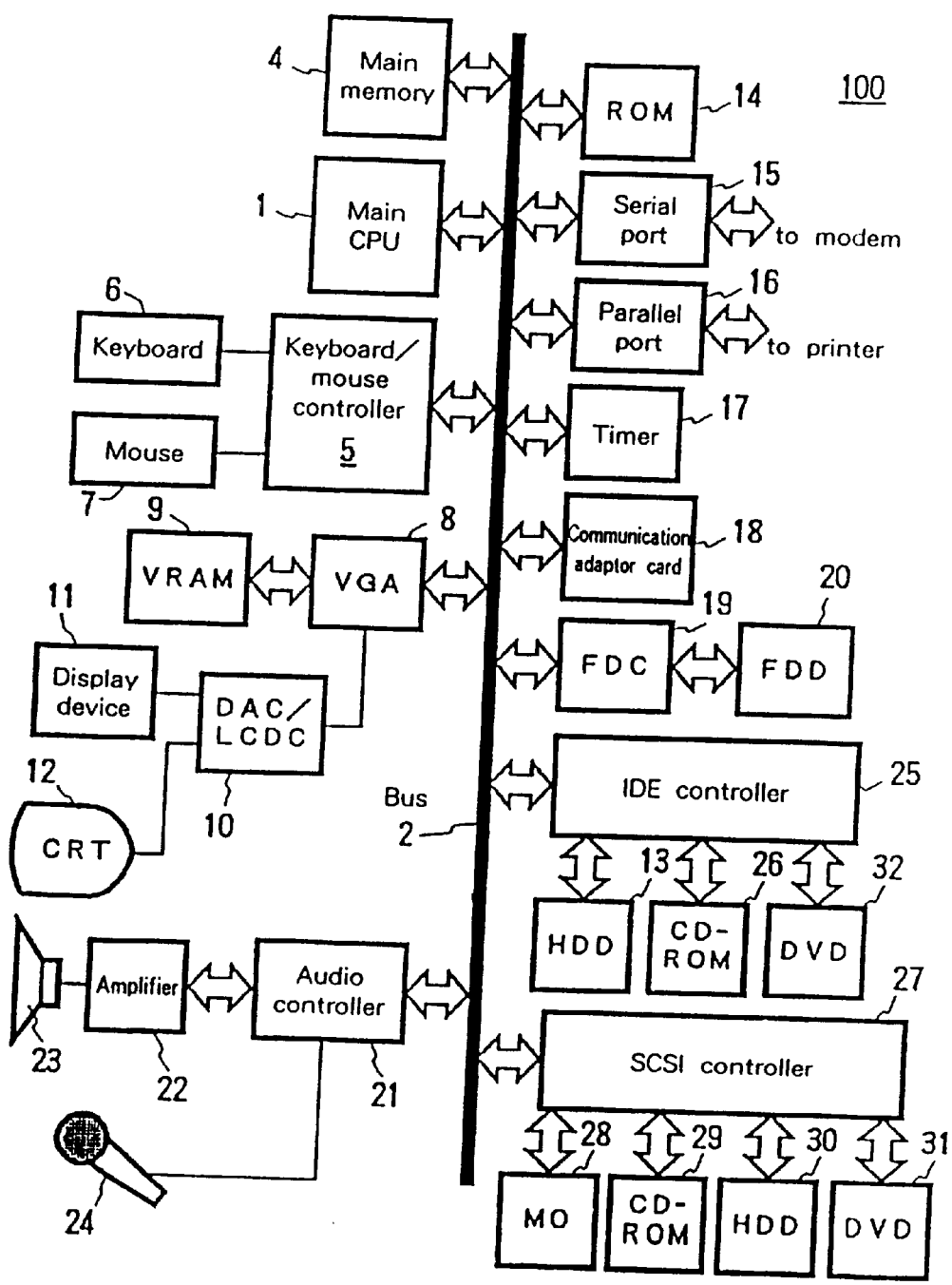
FIG. 5 is a diagram illustrating an exemplary hardware arrangement of a translation system according to the present invention.

The preferred embodiment of the present invention will now be described while referring to the accompanying drawings. FIG. 5 is a schematic diagram illustrating a hardware arrangement of a translation system according to the present invention. A system 100 includes a central processing unit (CPU) 1 and a memory 4. The CPU 1 and the memory 4 are connected via a bus 2 and an IDE controller 25 to a hard disk drive 13 (or to a storage medium driver, such as a CD-ROM 26 or a DVD 32), which serves as an auxiliary storage device.

Further, the CPU 1 and the memory 4 are connected via the bus 2 and a SCSI controller 27 to a hard disk drive 30 (or to a storage medium driver, such as an MO 28, a CD-ROM 29 or a DVD 31), which also serves as an auxiliary storage device for storing a dictionary, etc. A floppy disk drive 20 is connected via a floppy disk controller 19 to the bus 2.

A floppy disk is inserted into the floppy disk drive 20. Computer program code or data for cooperating with an operating system to instruct the CPU to execute the present invention is stored on the floppy disk and the hard disk drive 13 (a storage medium, such as an MO, CD-ROM or a DVD), and in a ROM 14. For execution, the program code and the data are loaded into the memory. The computer program code may be compressed, or may be divided into a plurality of segments for storage in a plurality of storage media.

The system 100 also includes user interface hardware, has a pointing device (e.g., a mouse, trackball, joystick, etc.) 7 or a keyboard 6 for data input, and employs a display 12 for visually providing data for a user. A printer can be connected to the system through a parallel port 16, and a modem can be connected through a serial port 15. For communication with another computer, the system 100 can be connected to a network, through the serial port 15, by the modem or a communication adaptor 18 (an Ethernet or a token ring card). A remote-controlled transceiver for the exchange of data using infrared rays or wire can be connected to the serial port 15 or the parallel port 16.

From an amplifier 22, a loudspeaker 23 receives an audio signal obtained by a D/A (digital/analog) conversion performed by an audio controller 21, and outputs it as sound. The audio controller 21 converts analog audio data, received from a microphone 24, into digital data, and also fetches external audio data into the system and translates the data in cooperation with sound recognition software.

From the above description, it should be easily understood that the translation system of the present invention can be implemented by employing a common personal computer (PC), a workstation; a notebook PC, a palmtop PC, a network computer, various electronic home appliances, such as a television incorporating a computer, a game machine having a communication function, a communication terminal having a communication function, such as a telephone, a facsimile machine, a portable telephone, a PHS or a personal digital assistant, or a combination of these devices. The above-described components are merely examples, and not all of them are required for the present invention.

A plurality of dictionaries and various types of buffers may be located in the memory 4, but usually, the memory 4 is used as a storage buffer for storing a discourse dictionary, translation results and a co-occurrence dictionary, and the hard disk 30 is used as a secondary storage device for storing a personal dictionary, etc. Compound words may be included in the co-occurrence dictionary, and when the origin (e.g., "singular form") is defined for each word, together with a part of speech it may be described as a limitation.

Generally, the co-occurrence dictionary is constituted by entries that each include two or more phrases, and their limitations and translations. Though there are an upper case and a lower case for a word, the word is supposed to be able to match either the stem of the word or the inflection of the word. When the part of speech is omitted, the word may match a word having a desired part of speech.

The structure of the co-occurrence dictionary is described below. Elements surrounded by square brackets, [ ], are optional.

[Priority:] co-occurrence word 1 [part of speech] [translation]; co-occurrence word 2 [part of speech] [translation]; . . .

The structure of the discourse dictionary (discourse dictionary buffer) is as follows:

| headword (word in a source language): | |
| --- | --- |
| candidate 1: | preference |
| candidate 2: | preference |
| .... | ... |
| candidate n: | preference |

The structure of the translation result recording buffer is as follows:

| headword (word in a source language): |
| --- |
| candidate 1: sentence translation No. 1 to sentence translation No. ml (m) |
| candidate 2: sentence translation No. 1 to sentence translation No. m2 (m2) |
| ... ... ... |
| candidate n: sentence translation No. 1 to sentence translation No. mn (mn) |

(Note: m, m2, . . . , and mn are the frequencies of the individual candidate words).

The structure of a personal dictionary is the same as the discourse dictionary.

FIG. 1 is a flowchart for the processing performed according to the present invention.

First, at step 110, beginning with the first sentence of an input document, the translation system extracts and processes sentences, one by one.

At step 120, a word string that constitutes a sentence to be processed is examined to find relevant compound words. When a word string is found corresponding to a compound word, the information for the relevant compound word (e.g., the character string of the compound word in the source language and the character string for the translation into a target language) is used for a discourse dictionary registration process at step 150.

At step 130, the single-word process is performed for the words that are not relevant to the compound word at step 120. When the translation of a single word is decided by conducting a search of the discourse dictionary or the co-occurrence dictionary, the translation is used. When the translation of the single word is not decided, that word is transmitted to a personal dictionary where a search for it is performed.

When the translation is returned, it is employed, and when no translation is returned, the word is output to the single-word dictionary where another search is performed to obtain the translation. The object word and its translation are output for the translation result recording process.

At step 140, a check is performed to determine whether the object word is present as a headword in the translation result recording buffer. When the object word is not present, a headword for the object word is created, and the candidate word, the sentence number and an appearance frequency of 1 are stored in the translation result recording buffer.

When the object word is present in the buffer, a check is performed to determine whether a candidate word for the object word is present. If a candidate word is present, a new sentence number is added to the old one, and the appearance frequency is incremented by one. When no candidate word is present, a candidate word, the sentence number and an appearance frequency of 1 are stored in the translation result recording buffer.

When, at step 160, all the words that are not relevant to the compound word have been processed, program control moves to step 170 whereat the translation process is activated upon the receipt of candidate words for all the words. When all the words have not yet been processed, program control returns to step 120.

At step 170, the translation process is performed, which is a conventional machine translation process. At step 170, morpheme analysis, grammar analysis, or another desired translation method may be performed. The difference in the contents of the machine translation process does not affect the subject of the present invention.

At step 180, a check is performed to determine whether all the sentences in a document have been translated. When all the sentences have been translated, a re-translation effect evaluation process is performed, at step 190.

Finally, at step 195, a personal dictionary registration process is performed. During this process, the contents of the discourse dictionary buffer are written over the contents of the personal dictionary. At this time, preference values are added so that a priority can be given to the preference held in the discourse dictionary buffer.

For example, for each headword in the personal dictionary, the preferences for the individual candidate words are normalized so that the total is constant. When the same candidate word is present for the same headword in the discourse dictionary buffer, the preference is added to again normalize the preferences in the personal dictionary. The re-translation process at step 190 and the personal dictionary registration process at step 195 are not always needed. However, by using these processes the accuracy of the translation can be increased.

Figure 2:
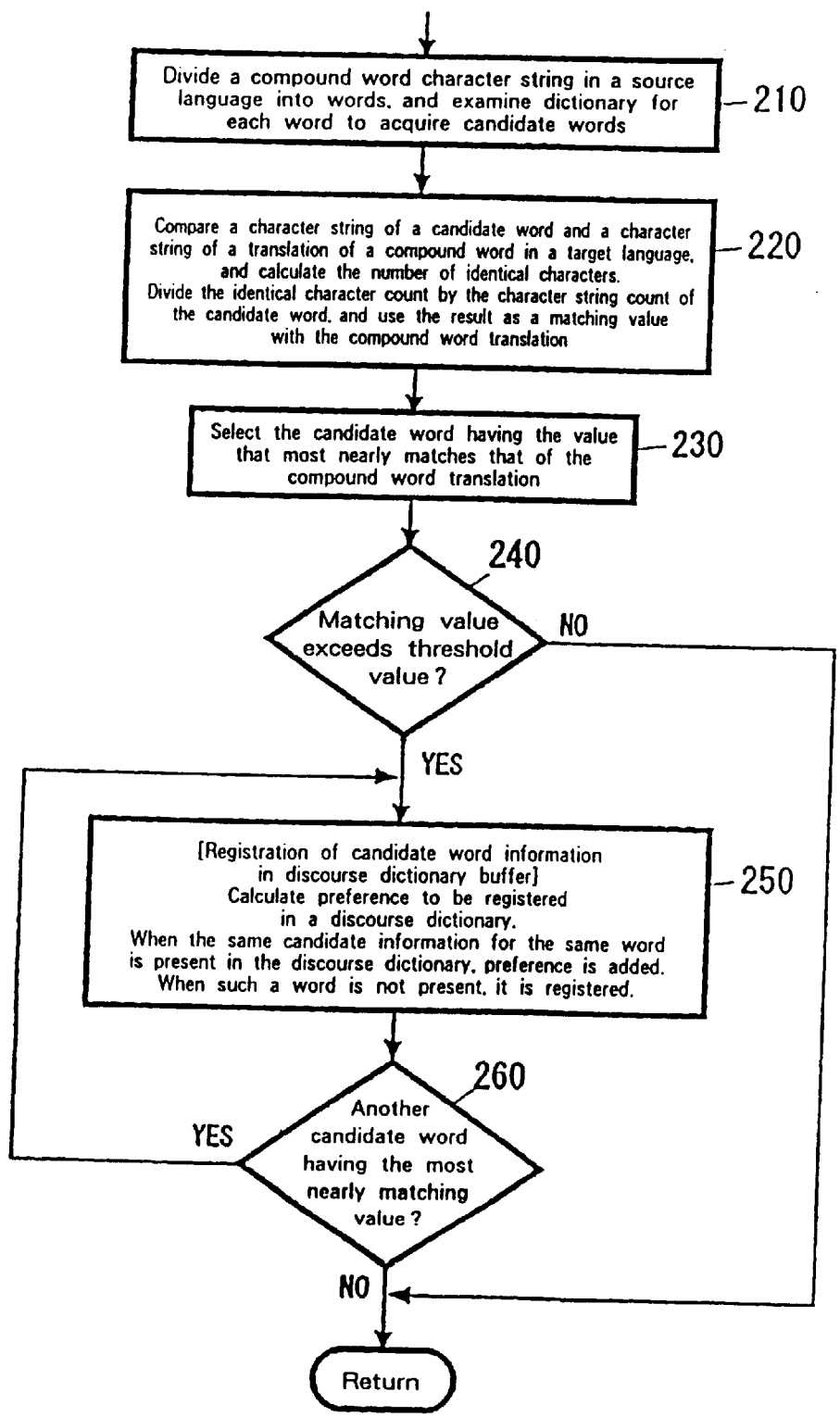
FIG. 2 is a flowchart showing the discourse dictionary registration process according to the present invention.

FIG. 2 is a detailed flowchart for the discourse dictionary registration process (e.g., step 150).

At step 210, of the received compound word information, a character string for a compound word in a source language is separated into words, which are then transmitted to a single-word dictionary where a search is performed to obtain candidate words for the individual words.

At step 220, the character string for each candidate word is compared with a character string in a target language, which is the translation of the compound word, to obtain the number of identical characters both in the candidate word character string and the target language character string. That character count is divided by the number of character strings for the candidate word, and the obtained value is used as a matching value for the compound word translation.

At step 230, the candidate word is selected having the value that most nearly matches that of the compound word translation.

At step 240 a check is performed to determine whether the matching value exceeds a threshold value set in advance.

If it is larger, at step 250 the information for the candidate word is registered in the discourse dictionary buffer. A plurality of candidate words may be registered, and when there is more than one candidate word, the following process is repeated.

When an object to be registered remains, the preference to be registered in the discourse dictionary is calculated. The value for matching with that of the compound word translation is multiplied by the coefficient according to the word length of the compound word, and the resultant value is used as the preference. For example, (preference)=(matching value with compound word translation)×
(square root of word count of compound words−1).

When an object to be registered remains, a check is performed to determine whether the word in the source language is included with the headword in the discourse dictionary. If not, the candidate word and the obtained preference are registered. If the word in the source language is included with the headword, a check is performed to determine whether or not the candidate word to be registered has already been listed among the candidate words that are registered. If the word has been listed, the obtained preference is added to the preference that is already registered. If the word has not been listed, the candidate word and the obtained preference are registered.

At step 260, a check is performed to determine whether there is another candidate word that has a most nearly matching value. If such a candidate word remains, the process loops back to step 250 to repeat steps 250 and 260.

Figure 3:
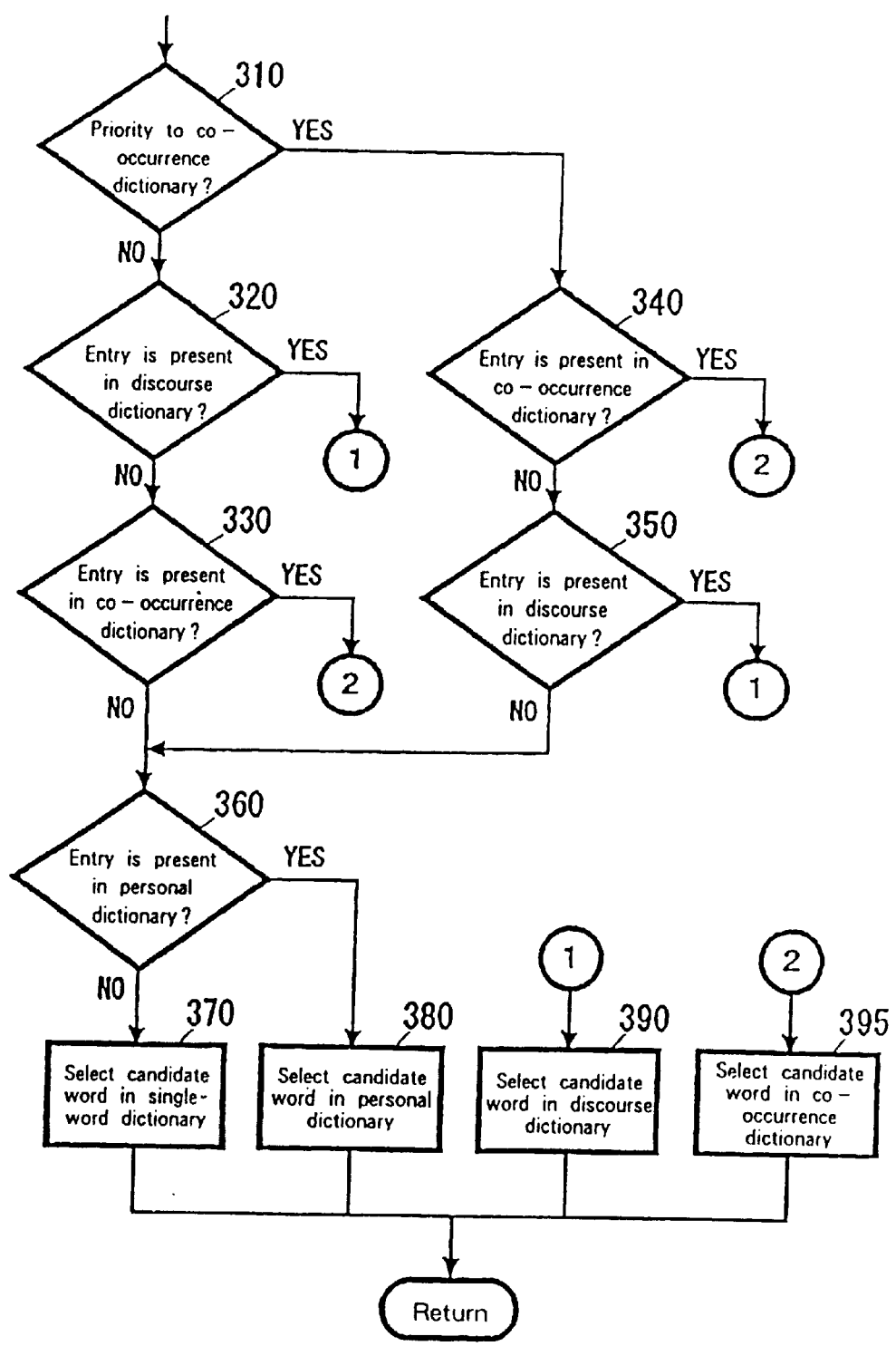
FIG. 3 is a flowchart showing the single-word determination process according to the present invention.

FIG. 3 is a detailed flowchart explaining the above described single-word process (step 130). According to the priority of the discourse dictionary and the co-occurrence dictionary, the following two processes are initiated.

When priority is given to the designation of the candidate word using the co-occurrence dictionary rather than the discourse dictionary, the decision at step 310 is YES, and program control moves to step 340.

At step 340, when words that appear in the sentence (or in a specific context) are defined as w1; w2; . . . ; wn, the co-occurrence dictionary is examined for a word, beginning at w1, for which the translation has not yet been established. In the co-occurrence dictionary, words for which all of the translations have been designated are used as headwords, and a set of entries by which the relationships of the words are described are stored in correspondence with the headwords.

When a specific entry in the co-occurrence dictionary is applied, at step 395, the designated translations of all the words included in the entry are stored. A co-occurrence dictionary entry is applied only once for each word, even if it has a plurality of matching relationships. As a result, the designations for the translations available for each word can be performed by n accesses of the co-occurrence dictionary.

When designated candidate words for one word conflict, the standard must be applied that priority is given to the candidate word for which a higher priority is designated in the co-occurrence dictionary, or to a candidate word in an entry that has the highest number of co-occurrence words. When there is no relevant entry recorded in the co-occurrence dictionary as determined in step 340, at step 350 the discourse dictionary search process is performed.

When priority is given to the designation of the candidate word using the discourse dictionary rather than the co-occurrence dictionary, the decision at step 310 is NO and program control moves to step 320.

At step 320, a check is performed to determine whether a given word is present as a headword in the discourse dictionary. If such a word exists, at step 390 the candidate word having the highest priority is selected (if there are a plurality of candidate words, only one word is selected).

If there is no entry relevant to the discourse dictionary, program control goes to at step 330, whereat the co-occurrence dictionary search process is performed.

Figure 4:
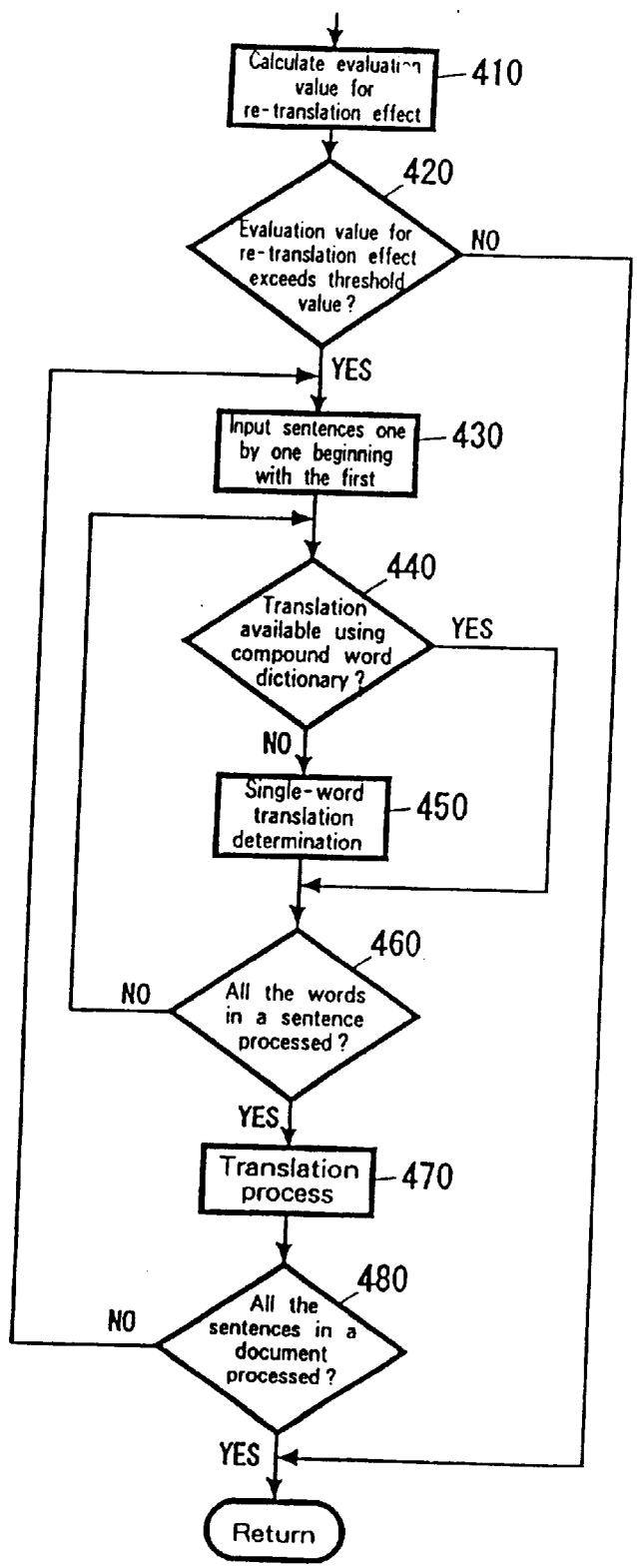
FIG. 4 is a flowchart showing the re-translation process according to the present invention.

FIG. 4 is a detailed flowchart for the re-translation process (step 190). At step 410, an evaluation value for the effect of the re-translation is calculated. Each headword in the discourse dictionary is processed, and a check is performed to determine whether each headword is registered in the translation result recording buffer. If all have been entered in the buffer, a check is performed to determine whether candidate words for the headword, other than a candidate word that has the highest priority, are present in the translation result recording buffer. If there are such candidate words in the buffer, the total of their appearance frequencies and all the sentence numbers are stored, and program control thereafter moves to the next headword process. When all the headwords available in the discourse dictionary have been processed, the level of the re-translation effect is evaluated by using the stored ratio of the appearance frequency to the number of sentences in the document.

When, at step 420, the level of the re-translation effect exceeds a threshold value that is set in advance, program control advances to step 430. If the level of the re-translation effect is below that of the threshold value, the processing is thereafter terminated.

At step 420, the level of the re-translation effect may be provided for a user, so that the user can express a desire for the re-translation.

The processing at step 430 and the following steps is the re-translation process for all the sentence numbers that have been stored. This processing is the same as those at steps 120, 130, 160, 170 and 180, except for the discourse dictionary registration process (step 150) and the translation result registration process (step 140).

The present invention will now be described by employing examples described below and illustrated in the Figures.

When a compound word dictionary is employed to translate a document, a discourse dictionary preparation method is employed whereby elemental word information of a compound word that is employed is registered in a discourse dictionary.

Assume that data "'civil trial'→'minji saiban'" is present in a compound word dictionary. When this data is applied for the translation of a sentence, " . . . a book about the civil trial with . . . ," in a document, candidate word information for "civil" and "trial" is registered in the discourse dictionary so that this information is reflected in the translation of the document.

A discourse dictionary description method is employed for describing elemental words, their candidate words, and preferences for these candidate words as the elemental word information for a compound word to be described in the discourse dictionary.

In the above example, the candidate words for "civil" and "trial" and their preferences (e.g., "'trial' 'saiban' 1.0") are described in the discourse dictionary.

According to the present invention, a candidate word selection method is employed whereby, to determine a translation for elemental words of a compound word to be described in a discourse dictionary, a candidate translation obtained from a single word dictionary for the elemental word is compared with a candidate translation for the compound word, and the candidate word that has the most nearly identical character string portion is selected. Additionally, a registration adequacy determination method is employed whereby registration of a compound word in a discourse dictionary is canceled when the ratio of the identical character string portion in the candidate word does not exceed a threshold value.

In the above example, in a single-word dictionary, the following candidate words are entered for "trial":

trial 0200 N kohanN+jN=jNOCONJG
trial 0201 N saibanN+jN=jNOCONJG
trial 0202 N tameshiN+jN=jNOCONJG
trial 0203 N shikenN+jN=jNOCONJG
trial 0204 N shikoN+jN=jNOCONJG
trial 0205 N shiyoN+jN=jNOCONJG
trial 0206 N shirenN+jN=jNOCONJG
trail 0207 N koteshirabeN+jN=jNOCONJG
trial 0208 N shinkuN+jN=jNOCONJG
trial 0209 N shinriN+jN=jNOCONJG
trial 0210 N +eABST kokoromiN+jN=jNOCONJG
trial 0211 ADJ shikentekiAP+jAN=jTYPENA The translation "minji saiban," for the compound word "civil trial," is compared with character strings of the individual candidate words, and the candidate word "saiban," which has the largest identical portion, is selected as a candidate word to be registered in the discourse dictionary. Candidate words for "civil" are as follows:

civil 0200 ADJ shiminN+jN+jNOCONJG
civil 0201 ADJ minkanN+jN+jNOCONJG
civil 0202 ADJ reigi tadashiiADJ+jADJ+jKEI
civil 0203 ADJ joyoN+jN+jNOCONJG There are two candidate words "shimin" and "minkan," which have character string portions identical to the translation "minji saiban" of the compound word "civil trial," and for both candidate words, the ratio for the identical portion to the character string portion is 50%. When a threshold value set in advance is lower than this value, both candidate words are registered, and when the threshold value is higher than this, neither word is registered.

A selection determination method is employed, whereby a numeral value, which is obtained by multiplying the word length of a compound word by the ratio of the identical character string portions of the candidate word to that of the compound word, is employed as a preference for the candidate word for the elemental word, and whereby, when the same candidate word has been registered with the same headword, a new preference value is added to a preference value that has already been provided.

In the above example, the ratio (=1) for the identical portion (="saiban") of the candidate word "saiban" to the translation "minji saiban" is multiplied by a coefficient according to the word length of a compound word (e.g., the word count in "civil trial"; two in this case). A greater coefficient is set as the word length is increased. In this case, the coefficient is the square root of N−1 when the word length is N. The obtained value (1.0 in this case) is used as the preference for the candidate word "saiban," for the word "trial" in "civil trial." When the same headword "trial" is already present in the discourse dictionary, and its candidate word "saiban" is also registered, the above obtained preference 1.0 is added to the preference that is already given for the registered word.

A candidate word selection method is employed whereby, when a specific sentence is to be translated, a discourse dictionary is referred to for a word for which a compound word dictionary can not be employed, and whereby, if a headword exits, a registered candidate word to which the highest preference is given is selected.

An automatic learning personal dictionary preparation method is employed, whereby a discourse dictionary consisting of units of translated sentences (e.g., one WWW page, one article, etc.) and a plurality of discourse dictionaries, which have been prepared for various sentences translated by a specific person, are merged to create an automatic learning personal dictionary.

A method for adjusting the learning function of a personal dictionary is used, whereby the preferences in an updated discourse dictionary are first selected to merge a plurality of discourse dictionaries.

A dictionary employment method is used whereby, when a compound dictionary is not employed to translate a specific document, a discourse dictionary is referred to first, and then an automatic learning personal dictionary is referred to.

Additionally, a method is employed whereby, to translate a specific document, candidate words into which individual words in a document were translated are recorded, the contents of the translation of the text are compared with a generated discourse dictionary when the translation is completed in order to evaluate how the first translation may be changed by re-translation, the evaluation results are provided for a user, and in response to a user's request, the translation is performed again by using the generated discourse dictionary.

A translation results recording method is used whereby headwords (words in a source language) and their candidate words, and the count of the headwords that were translated into the candidate words (or the sentence number of a translated sentence) are described as the translation results (e.g., a record of which candidate words were used for translating the individual words in a document).

A re-translation result change evaluation method is provided whereby, after a document has been translated, a discourse dictionary is compared with the translation, and a count is acquired of the words translated into words other than candidate words that have the highest preferences in the discourse dictionary, so that the number of locations at which the candidate words are changed through re-translation is acquired.

For re-translation of a document, a method for increasing the efficiency of a re-translation process is employed, whereby only those sentences are processed for which the translation will be changed.

A candidate word selection mechanism also is provided that employs a co-occurrence dictionary with which, when as candidate words there are n specific words, a minimum of one translation can be designated. Examples are described below:

House NOUN kain; Senate NOUN jooin;
bank NOUN dote; river NOUN;

In the first example, when nouns House and Senate appear in the same text (normally in the same sentence, but the range may be expanded to an entire paragraph or an entire document), the translations for these words are defined, respectively, as "kain" and "jooin." In the second example, when nouns "bank" and "river" appear in the same text, the translation of "bank" is defined as "dote."

Since these conflicts are reflective, when n words are included in one dictionary entry, candidate words for a maximum of n words are determined. When one entry is pertinent, all the words included in the entry appear. Thus, without taking the designation of the conflicting candidate words into account, an n-times search of the co-occurrence dictionary for each word is not required.

Conventionally, for the translation of a single word, unless a special translation mechanism is employed, either the first candidate word in the system dictionary is employed, or a candidate word selected by a user during the post-editing process is employed. When the co-occurrence dictionary of the present invention is employed, the translation of words according to the context can be provided without a complicated process, such as the grammatical description process, being performed. This is very effective not only for a person in charge of the development of a translation system, but also for a common user because it serves as a resource that compensates for a user's dictionary and designates more appropriate candidate words.

Further, in the translation system of the present invention, during the translation of a document priority information for candidate words is stored as the discourse dictionary, which is later used as a personal dictionary, so that the priority for a candidate word can be automatically learned.

While the invention has been described in terms of several preferred embodiments, those skilled in the art will recognize that the invention can be practiced with modification within the spirit and scope of the appended claims.

What is claimed is:

1. A translation system for performing translation using a plurality of dictionaries, comprising:

means for, during the translation of a document by using a compound word dictionary, registering in a discourse dictionary elemental word information of an applied compound word; and means for employing a plurality of dictionaries, including said discourse dictionary, to translate a word in the document that is not defined in the compound word dictionary, wherein the means for employing selects and translates a candidate word to which a highest preference is given among candidate words registered in the discourse dictionary, and wherein said preference is calculated by a ratio of an identical portion of a candidate word character string to a compound word translation character string, and by a coefficient obtained from a length of a compound word.

2. The translation system according to claim 1, wherein the plurality of dictionaries comprise at least one of a single word dictionary, a co-occurrence dictionary, and a discourse dictionary and a personal dictionary.

3. The translation system according to claim 1, wherein the means for registering includes:

means for, when a candidate word to be registered in said discourse dictionary is to be selected as the elemental word information, determining a translation for elemental words of a compound word to be described in a discourse dictionary, for comparing a candidate translation obtained from a single word dictionary for the elemental word with a candidate translation for the compound word, and for selecting the candidate word that has the most nearly identical character string portion.

4. The translation system according to claim 3, further comprising means for canceling registration of a compound word in a discourse dictionary when a ratio of the identical character string portion in the candidate word does not exceed a threshold value.

5. The translation system according to claim 2, wherein the co-occurrence dictionary comprises a co-occurrence dictionary with which, when as candidate words there are n specific words, a minimum of one translation can be designated, and wherein n is an integer greater than 0.

6. The translation system according to claim 5, wherein priority is designated for the discourse dictionary and the co-occurrence dictionary, and the dictionaries are employed for translation in accordance with higher priority.

7. The translation system according to claim 2, further comprising:

means for, to translate a specific document, recording candidate words into which individual words in a document were translated; and means for re-translating the document by using the plurality of dictionaries including a discourse dictionary that is generated when the translation is completed.

8. The translation system according to claim 2, further comprising:

means for preparing a discourse dictionary comprising units of translated sentences, and for merging the discourse dictionary to create an automatic learning personal dictionary.

9. A translation system, for performing translation using a plurality of dictionaries, comprising:

means for, during the translation of a document by using a compound word dictionary, registering in a discourse dictionary elemental word information of an applied compound word; and means for employing a plurality of dictionaries, including said discourse dictionary, to translate a word in the document that is not defined in the compound word dictionary, wherein the plurality of dictionaries comprise at least one of a single word dictionary, a co-occurrence dictionary and a discourse dictionary and a personal dictionary, wherein the means for employing selects and translates a candidate word to which a highest preference is given among candidate words registered in the discourse dictionary, and wherein said preference is calculated by a ratio of an identical portion of a candidate word character string to a compound word translation character string, and by a coefficient obtained from a length of a compound word.

10. The translation system according to claim 9, wherein, when a same candidate word has been registered with a same headword in a discourse dictionary, a new preference value is added to a preference value that has already been provided.

11. A translation method for performing translation using a plurality of dictionaries, comprising:

(a) during the translation of a document by using a compound word dictionary, registering in a discourse dictionary elemental word information of an applied compound word; and (b) employing a plurality of dictionaries, including the discourse dictionary, to translate a word in the document that is not defined in the compound word dictionary, wherein said employing selects and translates a candidate word to which a highest preference is given among candidate words registered in the discourse dictionary, and wherein said preference is calculated by a ratio of an identical portion of a candidate word character string to a compound word translation character string, and by a coefficient obtained from a length of a compound word.

12. The translation method according to claim 11, wherein the plurality of dictionaries comprise at least one of a single word dictionary, a co-occurrence dictionary, and a discourse dictionary and a personal dictionary.

13. The translation method according to claim 11, wherein said registering includes:

when a candidate word to be registered in said discourse dictionary is to be selected as the elemental word information, determining a translation for elemental words of a compound word to be described in a discourse dictionary, for comparing a candidate translation obtained from a single word dictionary for the elemental word with a candidate translation for the compound word, and for selecting the candidate word that has the most nearly identical character string portion.

14. The translation method according to claim 13, further comprising canceling registration of a compound word in a discourse dictionary when a ratio of the identical character string portion in the candidate word does not exceed a threshold value.

15. The translation method according to claim 16, wherein, when a same candidate word has been registered with a same headword in a discourse dictionary, a new preference value is added to a preference value that has already been provided.

16. A translation method for performing translation using a plurality of dictionaries, comprising:

(a) during the translation of a document by using a compound word dictionary, registering in a discourse dictionary elemental word information of an applied compound word; and (b) employing a plurality of dictionaries, including the discourse dictionary, to translate a word in the document that is not defined in the compound word dictionary, wherein the plurality of dictionaries comprise at least one of a single word dictionary, a co-occurrence dictionary, and a discourse dictionary and a personal dictionary, wherein said employing selects and translates a candidate word to which a highest preference is given among candidate words registered in the discourse dictionary, and wherein said preference is calculated by a ratio of an identical portion of a candidate word character string to a compound word translation character string, and by a coefficient obtained from a length of a compound word.

17. A translation method for performing translation using a plurality of dictionaries, comprising:

(a) during the translation of a document by using a compound word dictionary, registering in a discourse dictionary elemental word information of an applied compound word; and (b) employing a plurality of dictionaries, including the discourse dictionary, to translate a word in the document that is not defined in the compound word dictionary, wherein the plurality of dictionaries comprise at least one of a single word dictionary, a co-occurrence dictionary, and a discourse dictionary and a personal dictionary, wherein the co-occurrence dictionary comprises a co-occurrence dictionary with which, when as candidate words there are n specific words, a minimum of one translation can be designated, and wherein n is an integer greater than 0, wherein priority is designated for the discourse dictionary and the co-occurrence dictionary, and the dictionaries are employed for translation in accordance with higher priority, and said method further comprising:

to translate a specific document, recording candidate words into which individual words in a document were translated; and re-translating the document by using the plurality of dictionaries including a discourse dictionary that is generated when the translation is completed, and wherein the translation method further comprises:

preparing a discourse dictionary comprising units of translated sentences, and for merging the discourse dictionary to create an automatic learning personal dictionary.

18. A storing medium for storing a program for performing translation using a plurality of dictionaries, the program comprising:

(a) a function for, during the translation of a document by using a compound word dictionary, registering in a discourse dictionary elemental word information of an applied compound word; and (b) a function for employing a plurality of dictionaries, including the discourse dictionary, in order to translate a word in the document that is not defined in the compound word dictionary, wherein said function for employing selects and translates a candidate word to which a highest preference is given among candidate words registered in the discourse dictionary, and wherein said highest preference is calculated by a ratio of an identical portion of a candidate word character string to a compound word translation character string, and by a coefficient obtained from a length of a compound word.

* * * * *